(12) United States Patent  
Thivierge

(10) Patent No.: US 11,615,579 B1  
(45) Date of Patent: Mar. 28, 2023

(54) SURFACE ATTRIBUTE TRANSFER

(71) Applicant: Apple Inc., Cupertino, CA (US)

(72) Inventor: Eric G. Thivierge, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 17/154,024

(22) Filed: Jan. 21, 2021

Related U.S. Application Data

(60) Provisional application No. 62/966,641, filed on Jan. 28, 2020.

(51) Int. Cl.
*G06T 15/04* (2011.01)
*G06T 15/20* (2011.01)

(52) U.S. Cl.
CPC ............ *G06T 15/04* (2013.01); *G06T 15/205* (2013.01); *G06T 2200/24* (2013.01)

(58) Field of Classification Search
CPC .... G06T 15/04; G06T 15/205; G06T 2200/24
See application file for complete search history.

(56) References Cited

U.S. PATENT DOCUMENTS

| | | | |
|---|---|---|---|
| 7,400,331 B2 | 7/2008 | Levene et al. | |
| 7,864,173 B2 | 1/2011 | Handley et al. | |
| 10,325,407 B2 | 6/2019 | Lanier et al. | |
| 2016/0210781 A1* | 7/2016 | Thomas | G06F 3/017 |
| 2017/0357407 A1* | 12/2017 | Palmaro | G06T 15/04 |
| 2019/0206113 A1 | 7/2019 | Kipp et al. | |

* cited by examiner

*Primary Examiner* — King Y Poon
*Assistant Examiner* — Vincent Peren
(74) *Attorney, Agent, or Firm* — Thompson Hine LLP

(57) ABSTRACT

Various implementations disclosed herein include devices, systems, and methods that changes a surface attribute of a first object to include a surface attribute of a second object at an intersection of the two objects. For example, changing a surface attribute may include identifying an intersection between a displayed first object and a displayed second object in a graphical environment, determining whether the graphical environment is operating in a first mode or a different second mode in accordance with a determination that the graphical environment is operating in the first mode, responsive to the intersection between the displayed first object and the displayed second object identifying a portion of the first object where in the identified portion is intersecting the second object and changing a surface attribute of the portion of the first object to include a surface attribute of the second object at the intersection including the surface attribute.

18 Claims, 12 Drawing Sheets

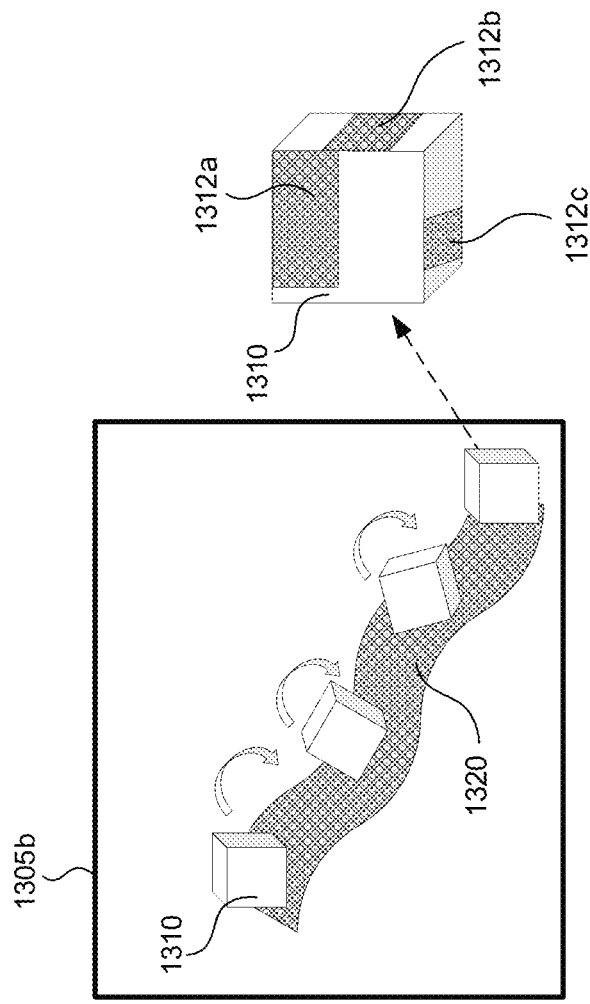
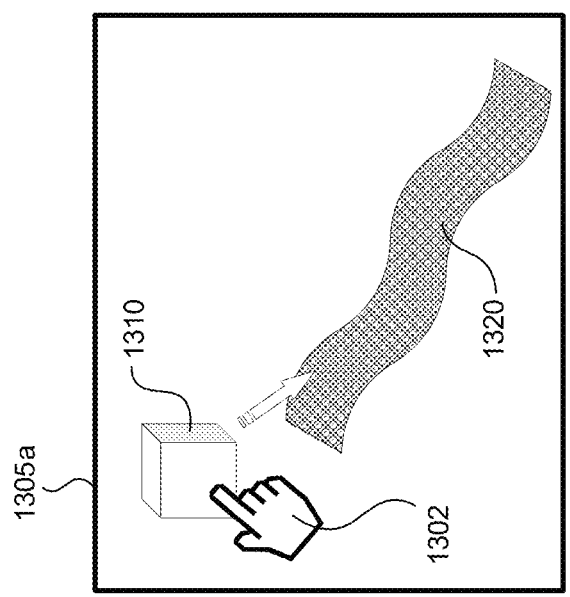
FIG. 13B
FIG. 13A

SURFACE ATTRIBUTE TRANSFER

CROSS-REFERENCE TO RELATED APPLICATIONS

This application claims the benefit of U.S. Provisional Application Ser. No. 62/966,641 filed Jan. 28, 2020, which is incorporated herein in its entirety.

TECHNICAL FIELD

The present disclosure generally relates to generating three-dimensional geometric representations of physical environments, and in particular, to systems, methods, and devices for creating content for the geometric representations.

BACKGROUND

Existing computing systems and applications do not adequately provide for creating content with desirable colors, textures, and properties for a content creation environment. For example, a user may desire to create a virtual object (e.g., a geometric representation of a physical object) and acquire an attribute (e.g., a surface texture, material properties, physical properties, etc.) of another object depicted in a content creation environment. In particular, in a content creation environment, it can be a complex and tedious process in existing systems to paint textures and create content to assign to computer generated surfaces. Usually specialized tools are required for artists to paint on the surfaces to assign colors, specularity, reflectivity, transparency, and other attributes.

SUMMARY

Implementations disclosed herein relate to a content creation environment for creating two-dimensional (2D) or three-dimensional (3D) content objects. In some implementations, surface attributes (e.g., surface texture, material properties, or physical properties) of a first object (e.g., a virtual cube) are defined based on interactions (e.g., intersection/contact) of the first object with a second object. For example, surfaces of the first object may be given colors or textures of surfaces of the second object based on object-to-object interactions. As a specific example, a surface of a virtual cube may be given colors and textures from a real or virtual table, rug, wall, or water. In one example, the first object is dipped into or passed through the second object and surface attributes of the second object are copied to one or more surfaces of the first object based on the contact between the objects during such dipping/passing through. In some implementations, the content creation environment facilitates such coping of a surface attribute from one object to another object using two different interaction modes, e.g., a first mode in which the objects interact to transfer the surface attributes and a second mode in which the objects interact differently (e.g., according to physics).

Some implementations of this disclosure involve an exemplary method of transferring surface attributes (e.g., surface texture, material properties, physical properties) to a first object (e.g., a virtual cube) based on interactions of the first object with a second object (e.g., any other object within the AR environment such as a table, a rug, a wall, water in a container, the ground, etc.) that is utilized as a source object in a 3D space of an environment (e.g., a CGR experience). The exemplary method initially involves identifying an intersection between a displayed first object and a displayed second object in a graphical environment. For example, the first object (e.g., the acquiring object) touches, is stamped on, is pushed into, is rolling down, or passed through the second object (e.g., the source object).

The exemplary method further involves determining whether the graphical environment is operating in a first mode or a different second mode. For example, the exemplary method focuses on using two interaction modes, i.e., a first mode in which the objects interact to transfer the surface attributes and a second mode in which the objects interact differently (e.g., according to physics). Additionally, for example, the first mode may enable attribute transfer, while the second mode may enable normal interaction and disable attribute transfer.

In accordance with a determination that the graphical environment is operating in the first mode, and responsive to the intersection between the displayed first object and the displayed second object, the exemplary method further involves identifying a portion of the first object where in the identified portion is intersecting the second object. In some implementations, identifying an intersection between two surfaces of two objects in the CGR experience is referred to herein as a trigger or trigger effect. For example, a trigger is when the geometry of each object intersects (e.g., when one or more pixels or voxels x, y, z coordinates of each object are equivalent).

Additionally, in accordance with a determination that the graphical environment is operating in the first mode, and responsive to the intersection between the displayed first object and the displayed second object (e.g., a trigger), the exemplary method further involves changing a surface attribute of the portion of the first object to include a surface attribute (e.g., a particular texture, a material, a physical property) of the second object (e.g., the source object) at the intersection including the surface attribute. For example, the texture along the line of intersection is transferred to the first object from the second object as the second object is dipped into, pushed into, stamped on, etc. the second object. In particular, for example, a virtual cube acquires the surface attributes of a painting that it touches or intersects with.

In some implementations, in accordance with a determination that the graphical environment is operating in the second mode, the exemplary method further involves responsive to the intersection between the displayed first object and the displayed second object, moving the displayed first object and the displayed second object is consistent with a model of physics. For example, in the second mode (e.g., no attribute transfer and the ability of two objects occupying the 3D space is turned off), a first object (e.g., a virtual cube) could not be pushed through a second object (e.g., a wall).

In some implementations, surface attributes of the first object are not changed based on surface attributes of the second object in response to intersections associated with the second mode. For example, in another mode, attribute transfer is turned off, but two objects could still occupy the same space. In other words, in this particular mode, a virtual cube could be pushed through a wall, but the surface attributes of the wall would be not transferred to the cube, because the user turned off the attribute transfer mode. In some implementations, the first mode enables the first object to pass through the second object, and the second mode prevents the first object from passing through the second object.

In some implementations, the intersection is based on user input moving the first object. For example, a user can move a virtual cube and using a particular motion with a mouse, cursor, or virtual hand, can dip, stamp, pushing into, etc. the virtual cube into a painting (e.g., source object). In some implementations, the user input moves the first object into the second object, wherein the second object remains unchanged based on the input. For example, a user puts the virtual cube into a box, and no attribute transfer takes place. In some implementations, the user input moves the first object into the second object, wherein the second object changes to surround an inserted portion of the first object. For example, hydro-dipping a virtual cube into a bucket of paint.

In some implementations, the intersection is based on a movement of the first object or the second object, and the movement is generated via a physics engine. For example, an object rolling down or across the second object, or an object is dropped/bounced on the ground. In some implementations, the intersection is based on a deformation of the first object or the second object, and the deformation is generated based on contact between the first object and the second object. For example, the object is hydro-dipped, or the object is dropped on a malleable/soft object (i.e., a pillow) on the ground.

In some implementations, the method further involves subtracting a second surface attribute from the first object based on a second intersection of the first object with a third object. For example, in an eraser mode, a user can erase surface attributes from objects in particular areas of the object, or for the entire object.

In some implementations, the portion of the first object is a first portion of the first object, and the method further involves identifying a second portion of the first object that will not change attributes based on the intersection, wherein the first portion of the first object includes at least a section of the second portion of the first object, wherein changing the first portion of the first object to include the surface attribute does not change the surface attribute in the second portion. For example, virtually using painter's tape, or the like, to identify a particular area to paint. For example, a user may only want a small portion or center of one surface of a cube to acquire a surface attribute from the source object, so a user can use painter's tape (e.g., masking tape) to cover the portion of the surface of the object that would now acquire the attributes of the second object when the virtual cube is stamped upon the second object.

In some implementations, the method further involves identifying a plurality of intersections involving the first object, and changing the first object based on the plurality of intersections. For example, to illustrate wear and tear, multiple interactions may occur for an object in the CGR experience, because the user is moving the first object (e.g., the virtual cube), during attribute transfer mode, to one or more source objects, and thus acquiring several attributes at different locations on the first object. In a specific example, grass stains and dirt stains on an avatars baseball player uniform from sliding into home plate, remain on the avatar throughout the gaming experience.

In some implementations, the surface attribute includes a texture. For example, RGB color, transferring pixels from one mesh's triangle to another mesh's triangle, or by copying equations that define appearance. In some implementations, the surface attribute includes a physical property. For example, a mass or a thickness of the source object. For example, a basketball could include physical attributes such as a particular thickness of the object. In some implementations, the surface attribute includes material property, such as reflective metal. In some implementations, the physical property of the source object could include an acoustic property. For example, wood would have a different acoustic property than concrete. In some implementations, the first object (e.g., a virtual cube) could acquire the acoustic properties of wood (e.g., from a chair) for half of the object, and acquire the acoustic properties of concrete for the remaining half of the object, such that in the CGR experience, if a user taps the first object, it would have different sounds depending on which half the user taps.

In some implementations, the first object corresponds to a virtual object and the second object corresponds to a real object of a physical environment in which the CGR environment is provided. For example, a virtual apple is thrown out to intersect with a real-world wall and acquires the color pattern of the wall.

Some implementations of this disclosure involve an exemplary method of transferring surface attributes (e.g., surface texture, material properties, physical properties, etc.) to a first object (e.g., a virtual cube) based on interactions of the first object with a second object (e.g., the source object, i.e., any other object within the CGR environment such as a table, a rug, a wall, water in a container, the ground, etc.) that is utilized as a source object in a 3D space of an environment (e.g., a CGR experience). The exemplary method initially involves displaying a movement of a first object in a 3D space of a computer-generated reality (CGR) environment, the CGR environment including a second object. For example, the first object (e.g., the acquiring object), such as a virtual cube, is displayed and is moving in a CGR environment that includes at least one other object, the second object (e.g., the source object).

The exemplary method further involves identifying an intersection between a portion of the first object and a portion of the second object during the movement of the first object. For example, a user may dip a virtual cube into a tub of paint and different portions of the surfaces of the cube may intersect different portions of the surface of the paint during the dipping movement. In some implementations, for example, the cube may similarly be pushed into a pillow to acquire the pillow texture. In another example, a ball may roll down a hill to acquire the grass pattern of the hill.

The exemplary method further involves changing the portion of the first object to include a surface attribute (e.g., a particular texture, material, physical property) based on the portion of the second object at the intersection including the surface attribute. For example, the texture along the line of intersection is transferred to the first object (e.g., the acquiring object) from the second object (e.g., the source object) as the second object is dipped into, pushed into, or rolled across the second object.

Some implementations of this disclosure involve an exemplary method of transferring surface attributes (e.g., surface texture, material properties, physical properties, etc.) to a first object (e.g., a virtual cube) based on interactions of the first object with a second object (e.g., the source object, i.e., any other object within the CGR environment such as a table, a rug, a wall, water in a container, the ground, etc.) that is utilized as a source object in a 3D space of an environment (e.g., a CGR experience). The exemplary method focuses on a first object or a second object being moved automatically based on a physics engine to intersect with the other object to control the acquiring of a surface attribute. For example, a user may throw, drop, or roll a first object to intersect with a second object. As another example, the second object may deform as a first object intersects with it. The exemplary method initially involves generating a movement of a first object or a second object in a three-dimensional (3D) space of a computer-generated reality (CGR) environment, the movement generated using a physics-engine. For example, a ball may roll down a hill to acquire the grass pattern of the hill, the user may drop a cube to bounce it on a table top, etc.

The exemplary method further involves identifying an intersection between a portion of the first object and a portion of the second object during the movement of the first object. In some implementations, identifying an intersection between two surfaces of two objects in the CGR experience is referred to herein as a trigger or trigger effect. For example, a trigger is when the geometry of each object intersects (e.g., when one or more pixels or voxels x, y, z coordinates of each object are equivalent).

The exemplary method further involves changing the portion of the first object to include a surface attribute based on the portion of the second object at the intersection including the surface attribute.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 13A-13B illustrate an example attribute transfer event between two objects in accordance with some implementations.

Figure 1:
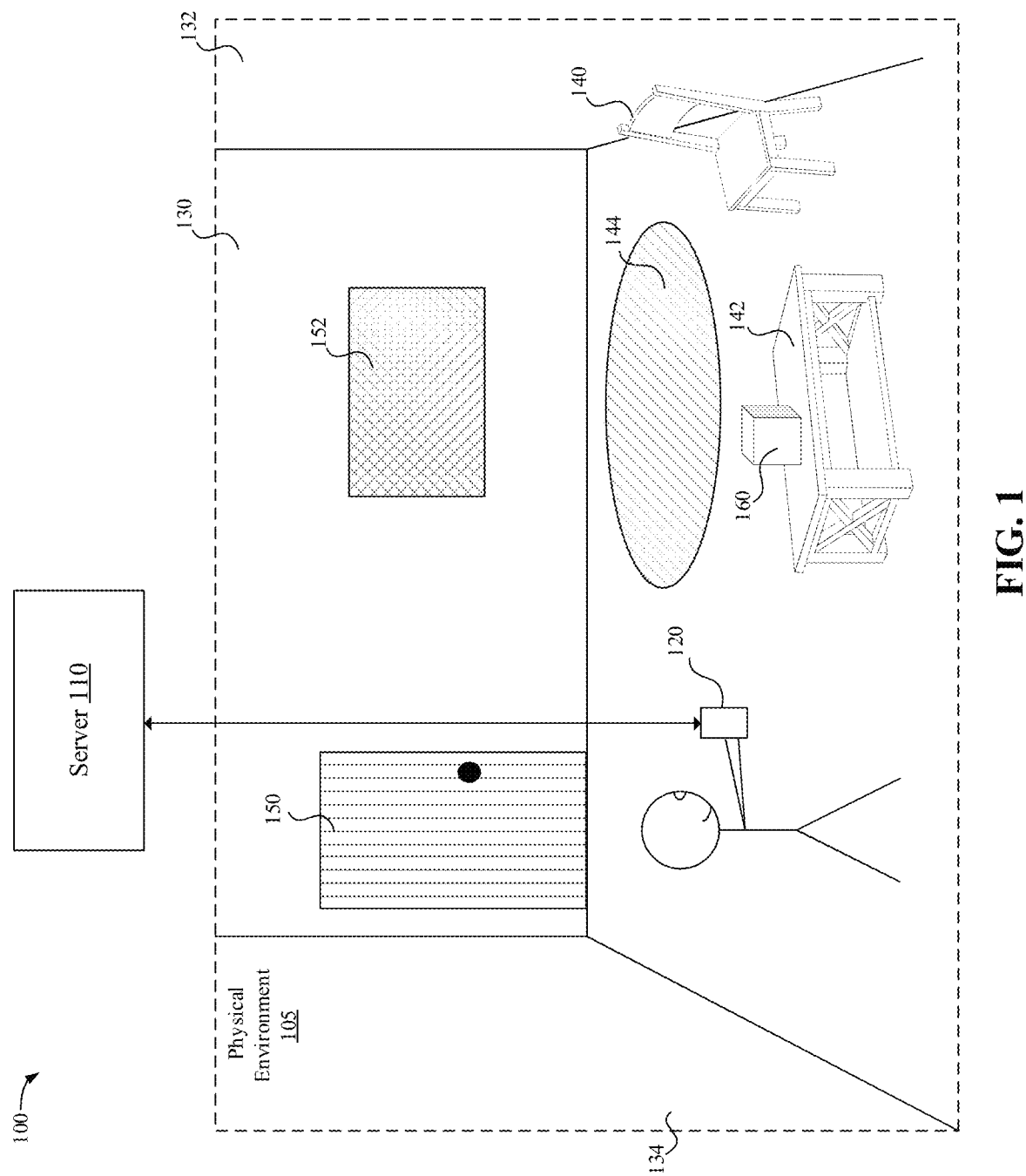
FIG. 1 illustrates an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that generate a computer graphical environment of a physical environment (a computer-generated reality (CGR) experience) that allows a user to change a surface attribute of a portion of a first object (e.g., a virtual object or a computer generated object that represents a real object) to include a surface attribute of a second object (e.g., another object in the CGR environment such as a painting, the floor, a wall, etc.) at an intersection between the two objects. For example, a virtual cube could acquire the surface attributes of a painting on all sides, on one particular side, or whichever portion intersects the second object (e.g., referred to herein as the source object). The CGR experience (e.g., a three-dimensional (3D) model) is generated based on images of a physical environment, depth information detected in the physical environment, and other information for tracking the devices/depth camera's particular position and orientation. It may be desirable to acquire surface attributes (e.g., surface texture, material properties, physical properties, etc.) from various objects from the CGR experience that is generated for various reasons. For example, it may be desirable to acquire surface attributes of objects that would be difficult to replicate for computer graphic artists. As a specific example, an artist may be trying to replicate the color, texture, specularity, etc., of a carpeted floor onto another object. Or there may be a unique painting in the real environment (e.g., the source object) that is recreated in the CGR experience that the artist wants to replicate the surface attributes of the painting and put those surface attributes onto other objects in the CGR environment to create a unique object (e.g., a virtual cube with the painting wrapped around it). Providing an artist with the ability to quickly acquire surface attributes of other objects in the CGR experience would provide a more efficient and useful manner to paint a CGR environment.

In some implementations, attribute transfer involves a trigger effect (e.g., an activation) when one object (e.g., the acquiring object) is touched onto another surface of another object (e.g., the source object), or pushed into or through another object (e.g., a wall). A trigger is when the geometry of each object intersects (e.g., when one or more pixels or voxels x, y, z coordinates of each object are equivalent). In the physical world, two objects cannot occupy the same space. In the virtual world (e.g., a CGR experience) two objects can virtually occupy the same space.

Additionally, the attribute transfer algorithms described herein, can simulate the effect of hydrodipping (also known as immersion printing, water transfer printing, and hydro imaging) is a unique process that allows you to apply graphics to almost any 3D object (e.g., dipping an object into a liquid that includes a layer of paint) in a CGR environment. For example, when the surface of two computer graphic objects touch and pass through each other, the parts where the surfaces touch transfers the texture information. For example, dipping a virtual object into a bucket of water, where the water could first acquire, using techniques described herein, surface attributes of any other object in the CGR environment. For a specific example, a water in a bucket could acquire surface attributes of a wall, thus, when the user dips the virtual cube in the bucket of water, the surface attributes of the wall that are in the water, would be dipped onto the block to as far as the object is dipped by the user into the water.

FIG. 1 is a block diagram of an example operating environment 100 in accordance with some implementations. In this example, the example operating environment 100 illustrates an example physical environment 105 that includes walls 130, 132, 134, chair 140, table 142, rug 144, door 150, painting 152, and object 160. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

According to some implementations, the device 120 presents a computer-generated reality (CGR) environment to the user while the user is in the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. In some implementations, the image data is pixel-registered with the images of the physical environment 105 (e.g., RGB, depth, and the like) that is utilized with the imaging process techniques within the CGR environment described herein.

Examples of CGR include virtual reality and mixed reality. A virtual reality (VR) environment refers to a simulated environment that is designed to be based entirely on computer-generated sensory inputs for one or more senses. A VR environment includes virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the user wears the device 120 on his/her head. As such, the device 120 may include one or more displays provided to display content. For example, the device 120 may enclose the field-of-view of the user. In some implementations, the device 120 is a handheld electronic device (e.g., a smartphone or a tablet) configured to present content to the user. In some implementations, the device 120 is replaced with a chamber, enclosure, or room configured to present content in which the user does not wear or hold the device 120.

Figure 2:
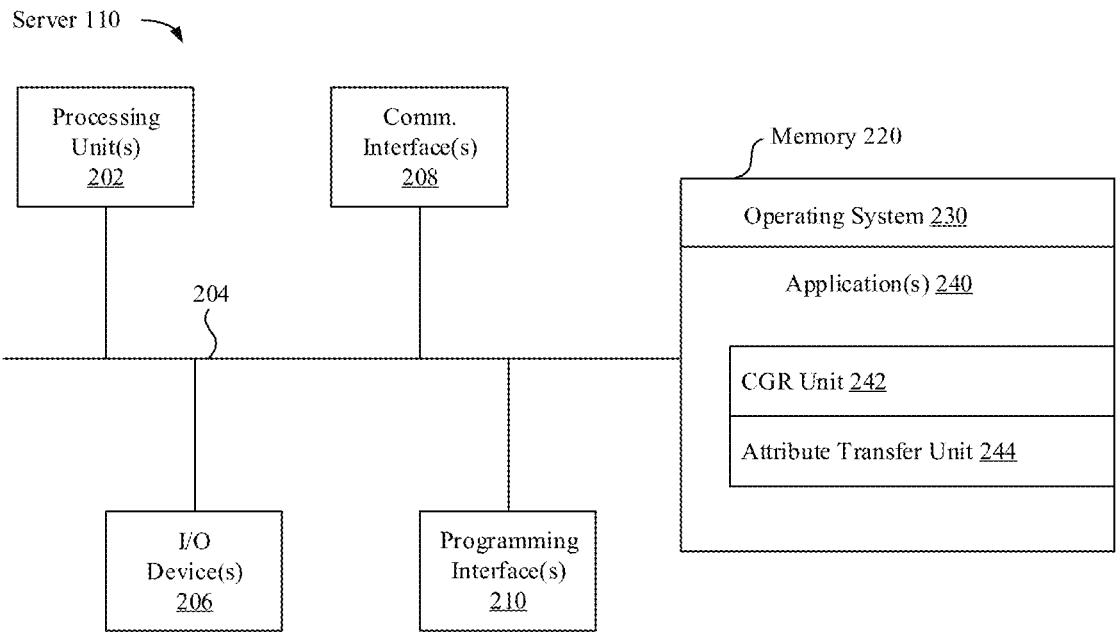
FIG. 2 illustrates an example controller in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 includes a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the operating system 230 includes built in CGR functionality, for example, including a CGR environment application or viewer that is configured to be called from the one or more applications 240 to display a CGR environment within a user interface. In some implementations, the applications 240 are configured to manage and coordinate one or more experiences for one or more users (e.g., a single experience for one or more users, or multiple experiences for respective groups of one or more users). The applications 240 include a CGR unit 242 and an attribute transfer unit 244. The CGR unit 242 and the attribute transfer unit 244 can be combined into a single application or unit or separated into one or more additional applications or units.

The CGR unit 242 is configured with instructions executable by a processor to provide a CGR environment that includes depictions of a physical environment including real objects and virtual objects. The virtual objects may be positioned based on the detection, tracking, and representing of objects in 3D space relative to one another based on stored 3D models of the real objects and the virtual objects, for example, using one or more of the techniques disclosed herein. The CGR unit 242 is further configured with instructions executable by a processor to obtain image data (e.g., light intensity data, depth data, etc.) and integrate (e.g., fuse) the image data using one or more of the techniques disclosed herein. For example, the CGR unit 242 fuses RGB images from a light intensity camera with a sparse depth map from a depth camera (e.g., time-of-flight sensor) and other sources of physical environment information to output a dense depth point cloud of information. Additionally, the CGR unit 242 is configured with instructions executable by a processor to obtain light intensity image data (e.g., RGB) and perform a semantic segmentation algorithm to assign semantic labels to recognized features in the image data and generate semantic image data (e.g., RGB-S) using one or more of the techniques disclosed herein. The CGR unit 242 is further configured with instructions executable by a processor to obtain light intensity image data (e.g., RGB) and depth image data and generate a semantic 3D representation (e.g., a 3D point cloud with associated semantic labels) using one or more of the techniques disclosed herein. In some implementations, the CGR unit 242 includes separate units, such as an integration unit to generate the 3D point cloud data, a segmentation unit for semantic segmentation based on light intensity data (e.g., RGB-S), and a 3D model unit to generate the 3D model representation, as further discussed herein with reference to FIG. 4.

The attribute transfer unit 244 is configured with instructions executable by a processor to change a portion of a first object (e.g., the acquiring object) to include a surface attribute (e.g., a particular texture, material, physical property) from a second object (e.g., the source object) based on an intersection between the two objects using one or more of the techniques disclosed herein. For example, the attribute transfer unit 244 may identify intersections between two objects during movement of the first object (e.g., a user moves an object in an CGR environment) as the first object is stamped onto, dipped into, pushed into, or rolled across the second object, and then transfers a surface attribute from the second object to the first object at the intersecting points.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
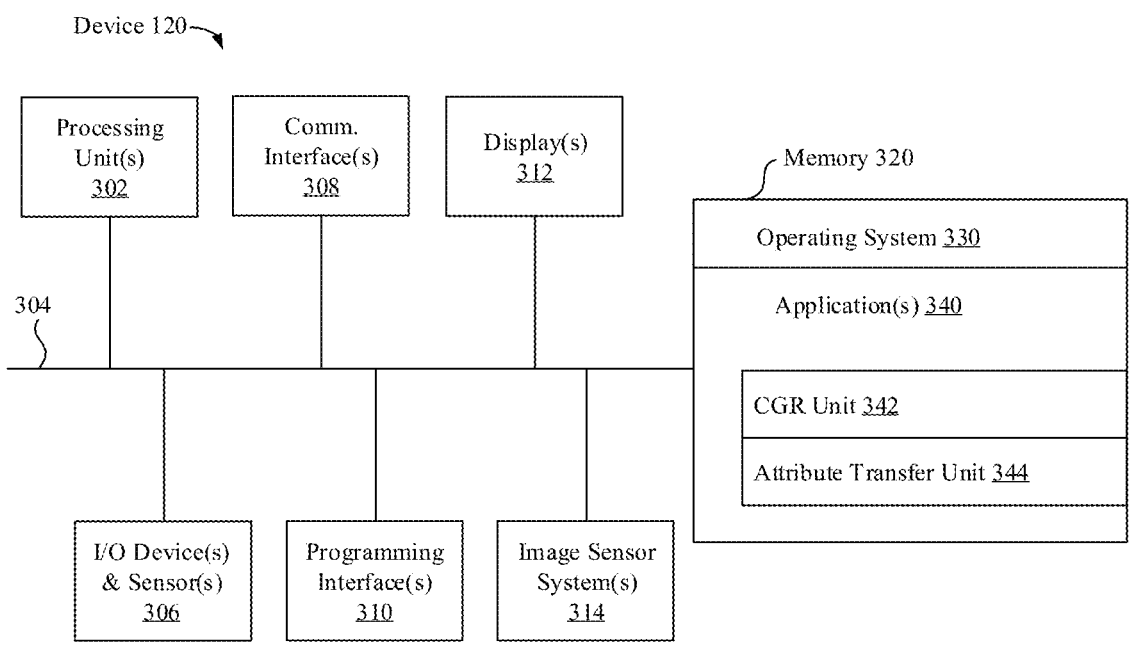
FIG. 3 illustrates an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 includes a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the operating system 330 includes built in CGR functionality, for example, including an CGR environment application or viewer that is configured to be called from the one or more applications 340 to display a CGR environment within a user interface. In some implementations, the applications 340 are configured to manage and coordinate one or more experiences for one or more users (e.g., a single experience for one or more users, or multiple experiences for respective groups of one or more users). The applications 340 include a CGR unit 342 and an attribute transfer unit 344. The CGR unit 342 and the attribute transfer unit 344 can be combined into a single application or unit or separated into one or more additional applications or units.

The CGR unit 342 is configured with instructions executable by a processor to provide a CGR environment that includes depictions of a physical environment including real objects and virtual objects. The virtual objects may be positioned based on the detection, tracking, and representing of objects in 3D space relative to one another based on stored 3D models of the real objects and the virtual objects, for example, using one or more of the techniques disclosed herein. The CGR unit 342 is further configured with instructions executable by a processor to obtain image data (e.g., light intensity data, depth data, etc.) and integrate (e.g., fuse) the image data using one or more of the techniques disclosed herein. For example, the CGR unit 342 fuses RGB images from a light intensity camera with a sparse depth map from a depth camera (e.g., time-of-flight sensor) and other sources of physical environment information to output a dense depth point cloud of information. Additionally, the CGR unit 342 is configured with instructions executable by a processor to obtain light intensity image data (e.g., RGB) and perform a semantic segmentation algorithm to assign semantic labels to recognized features in the image data and generate semantic image data (e.g., RGB-S) using one or more of the techniques disclosed herein. The CGR unit 342 is further configured with instructions executable by a processor to obtain light intensity image data (e.g., RGB) and depth image data and generate a semantic 3D representation (e.g., a 3D point cloud with associated semantic labels) using one or more of the techniques disclosed herein. In some implementations, the CGR unit 342 includes separate units, such as an integration unit to generate the 3D point cloud data, a segmentation unit for semantic segmentation based on light intensity data (e.g., RGB-S), and a 3D model unit to generate the 3D model representation, as further discussed herein with reference to FIG. 4.

The attribute transfer unit 344 is configured with instructions executable by a processor to change a portion of a first object (e.g., the acquiring object) to include a surface attribute (e.g., a particular texture, material, physical property) from a second object (e.g., the source object) based on an intersection between the two objects using one or more of the techniques disclosed herein. For example, the surface attribute transfer unit 344 may identify intersections between two objects during movement of the first object (e.g., a user moves an object in an CGR environment) as the first object is stamped onto, dipped into, pushed into, or rolled across the second object, and then transfers a surface attribute from the second object to the first object at the intersecting points.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Device 120 of FIG. 3 may be implemented as a head-mounted device (HMD) or other device that will present a view of the CGR environment. For example, a HMD may include internal sensors or be used with external sensors that track the HM Ds current position and orientation in a 3D coordinate system over time. The tracking may involve computer vision, visual inertial odometry (VIO), simultaneous localization and mapping (SLAM), or any other appropriate technique. In some implementations, the viewpoint is associated with the actual pose of a real device. In some implementations, the viewpoint is associated with a virtual pose of a virtual camera.

Figure 4:
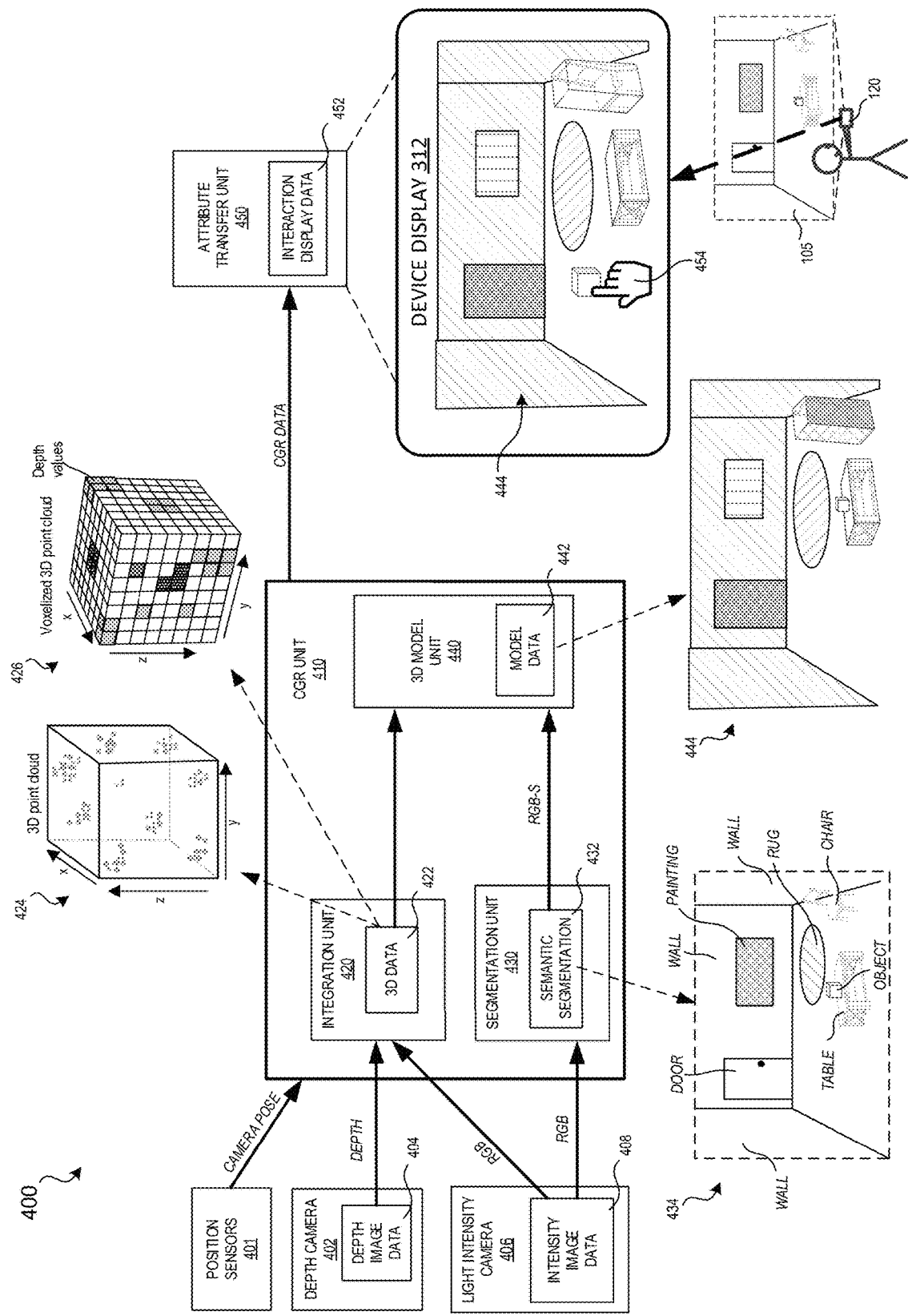
FIG. 4 is a system flow diagram of an example surface attribute transfer between two objects in a CGR environment according to some implementations.

FIG. 4 is a system flow diagram of an example environment 400 in which a system can generate a 3D representation (e.g., a CGR experience) and attribute transfer interaction data using 3D data and segmentation data based on depth and light intensity image information detected in the physical environment. In some implementations, the system flow of the example environment 400 is performed on a device (e.g., server 110 or device 120 of FIGS. 1-3), such as a mobile device, desktop, laptop, or server device. The system flow of the example environment 400 can be displayed on a device (e.g., device 120 of FIGS. 1 and 3) that has a screen for displaying images and/or a screen for viewing stereoscopic images such as a head-mounted display (HMD). In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

The system flow of the example environment 400 acquires light intensity image data 408 (e.g., live camera feed from light intensity camera 406), depth image data 406 (e.g., depth image data from depth camera 404), and other sources of physical environment information (e.g., camera positioning information from position sensors 401) of a physical environment (e.g., the physical environment 105 of FIG. 1), and generates 3D model data 442 and a 3D representation 444 from the CGR unit 410, and interaction display data 452 for attribute transfer from the attribute transfer unit 450. The 3D model data 442 could be a 3D representation representing the surfaces in a 3D environment using a 3D point cloud with associated semantic labels (e.g., 3D point cloud 614 with semantic labels).

In an example implementation, the environment 400 includes an image composition pipeline that acquires or obtains data (e.g., image data from image source(s)) for the physical environment. Example environment 400 is an example of acquiring image data (e.g., light intensity data and depth data) for a plurality of image frames. The image source(s) may include a depth camera 402 that acquires depth data 404 of the physical environment, and a light intensity camera 406 (e.g., RGB camera) that acquires light intensity image data 408 (e.g., a sequence of RGB image frames).

The example environment 400 includes a CGR unit 410 (e.g., CGR unit 242 of FIG. 2, and/or CGR unit 342 of FIG. 3) that includes an integration unit 410 that is configured with instructions executable by a processor to obtain the image data (e.g., light intensity data 408, depth data 406, etc.) and positioning information (e.g., camera pose from position sensors 401) and integrate (e.g., fuse) the image data using one or more known techniques. For example, the image integration unit 420 receives depth image data 404 (e.g., sparse depth data) and intensity image data 408 (e.g., RGB) from the image sources (e.g., light intensity camera 406 and depth camera 402), and integrates the image data and generates 3D data 422. The 3D data 422 can include a dense 3D point cloud 424 (e.g., imperfect depth maps and camera poses for a plurality of image frames around the object) that is sent to the 3D model unit 440. The different size grey dots in the 3D point cloud 424 represent different depth values detected within the depth data. For example, image integration unit 420 fuses RGB images from a light intensity camera with a sparse depth map from a depth camera (e.g., time-of-flight sensor) and other sources of physical environment information to output a dense depth point cloud of information. The 3D data 422 can also be voxelized, as represented by the voxelized 3D point cloud 426, where the different shading on each voxel represents a different depth value.

For the positioning information, some implementations include a visual inertial odometry (VIO) system to determine equivalent odometry information using sequential camera images (e.g., light intensity data 408) to estimate the distance traveled. Alternatively, some implementations of the present disclosure may include a SLAM system (e.g., position sensors 401). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

The CGR unit 410 further includes a segmentation unit 430 that is configured with instructions executable by a processor to obtain the light intensity image data (e.g., light intensity data 408) and identify and segment wall structures (wall, doors, windows, etc.) and objects (e.g., person, table, teapot, chair, vase, etc.) using one or more known techniques. For example, the segmentation unit 430 receives intensity image data 408 from the image sources (e.g., light intensity camera 406), and generates segmentation data 432 (e.g., semantic segmentation data such as RGB-S data). For example, the semantic segmentation data 434 illustrates an example semantically labelled image of the physical environment 105 in FIG. 1. In some implementations, segmentation unit 430 uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

The CGR unit further includes a 3D model unit 440 that is configured with instructions executable by a processor to obtain the 3D data 422 (e.g., 3D point cloud data 424) from the integration unit 420, obtain the segmentation data 432 (e.g., RGB-S data) from the segmentation unit 430, and obtain camera positioning information (e.g., camera pose data from position sensors 401), and generate 3D model data 442 using one or more techniques described herein. For example, the 3D model unit 440 generates a 3D representation 444 by acquiring the 3D data 422, and the semantic segmentation data 432, and fusing the 3D data and semantic labels. As illustrated in FIG. 4, the CGR unit generates CGR data (e.g., 3D representation 444) and provides the CGR data for display (e.g., displayed on a device such as device 120 of FIGS. 1 and 3).

In some implementations, the 3D model data 442 is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) is used to generate a mesh representing a room (e.g., physical environment 105) and/or object(s) within a room (e.g., wall 130, door 150, chair 140, table 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

The example environment 400 further includes an attribute transfer unit 450 (e.g., attribute transfer unit 244 of FIG. 2, and/or attribute transfer unit 344 of FIG. 3) that is configured with instructions executable by a processor to obtain CGR data and generate interaction display data for attribute transfer interaction using one or more known techniques. For example, the attribute transfer unit 450 receives CGR data (e.g., CGR environment data based on the 3D model data 442) from the CGR unit 410. The attribute transfer unit 450 then generates interaction display data 452 that can be used to interact with the CGR data. As illustrated in FIG. 4, the interaction display data 452 is shown on the device display 312 of FIG. 3, which represents a user viewing the example environment 105 using the device 120 as illustrated in FIG. 1. In some implementations, the interaction display data 452 includes an interaction icon 454 illustrated as a hand icon. The interaction icon 454 can be selected by the user on a touch screen, moved by a user with an input device (e.g., a mouse), controlled using AR controls (e.g., detecting movement of the user's hands to control the interaction icon 454), or by any other means for controlling an interaction icon within a CGR experience. In some implementations, the device display 312 can display a live view (e.g., light intensity image data 408) and the interaction display data overlaid on the live view (e.g., augmented reality). For example, a user wearing a head mounted device, can be viewing the real physical environment 105, and the interaction display data would display the interaction icon 454, and an other CG objects, such as a virtual cube. The interaction icon 454 can then be used by the user to move and "paint" the virtual cube with surface attributes (e.g., surface texture, material properties, physical properties, etc.) of detectable objects in the environment 105 using techniques described herein. Some examples of attribute transfer are further described below.

Figure 5:
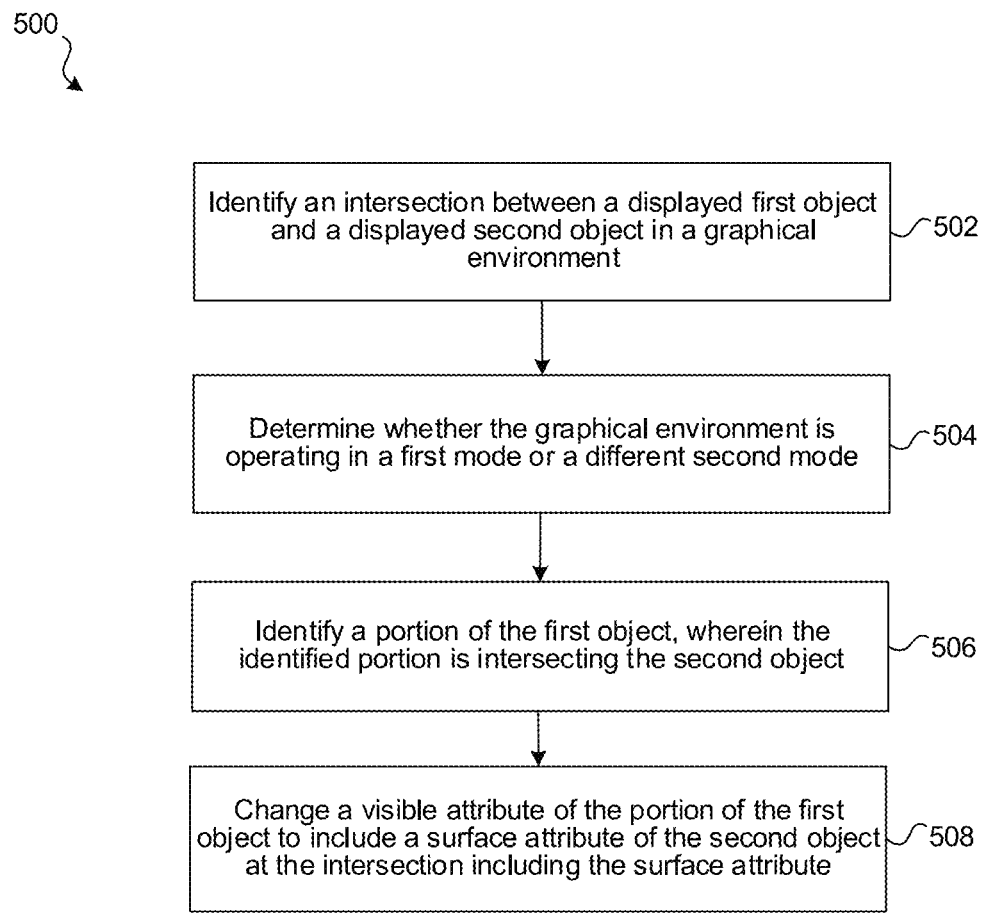
FIG. 5 is a flowchart representation of an exemplary method that performs a surface attribute transfer between two objects in a CGR environment in accordance with some implementations.

FIG. 5 is a flowchart representation of an exemplary method 500 that changes a surface attribute of a portion of a first object (e.g., an acquiring object) to include a surface attribute of a second object (e.g., a source object) at an intersection including the surface attribute. In some implementations, the method 500 is performed by a device (e.g., server 110 of FIGS. 1 and 2), such as a mobile device, desktop, laptop, or server device. The method 500 can be performed on a device (e.g., device 120 of FIGS. 1 and 3) that has a screen for displaying 2D images and/or a screen for viewing stereoscopic images such as a head-mounted display (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). The surface attribute transfer process of method 500 is illustrated with reference to FIGS. 6-8.

Figure 6B:
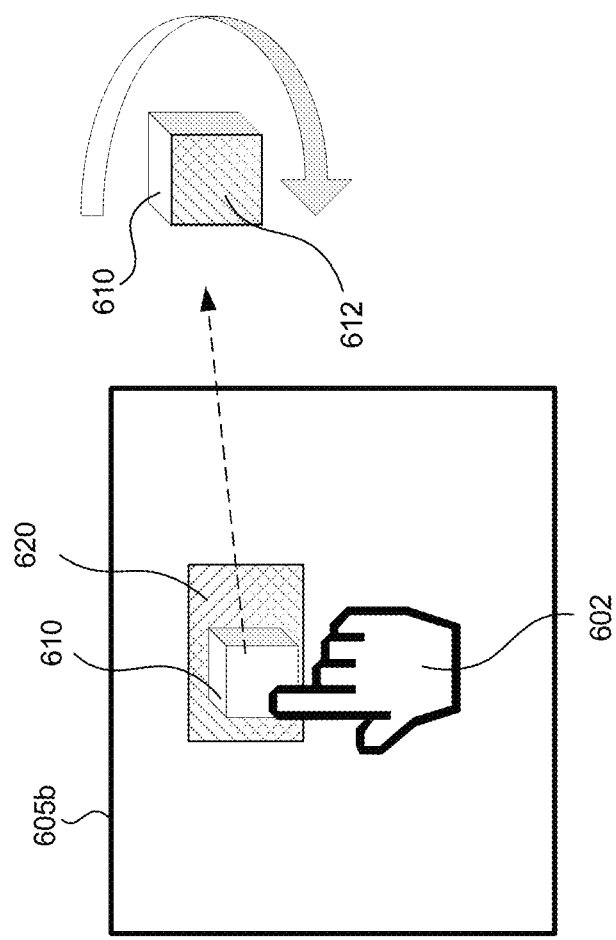
FIGS. 6A-6B illustrate an example attribute transfer event between two objects in accordance with some implementations.
Figure 6A:
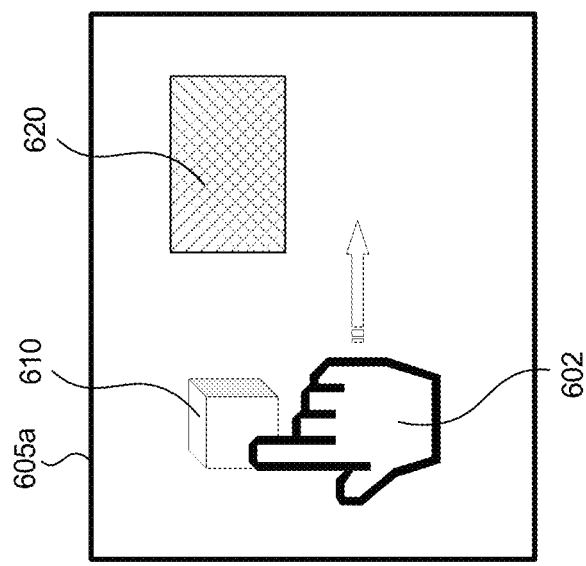

At block 502, the method 500 identifies an intersection between a displayed first object and a displayed second object in a graphical environment. For example, the first object (e.g., the acquiring object) touches, is stamped on, is pushed into, is rolling down, or passed through the second object (e.g., the source object). In some implementations, attribute transfer involves a trigger effect (e.g., an activation) when one object (e.g., the acquiring object) is touched onto another surface of another object (e.g., the source object), or pushed into or through another object (e.g., a wall). A trigger is when the geometry of each object intersects (e.g., when one or more pixels or voxels x, y, z coordinates of each object are equivalent). In the physical world, two objects cannot occupy the same space. In the virtual world (e.g., a CGR experience) two objects can virtually occupy the same space. FIGS. 6A-6B illustrate a stamping example with a virtual cube (e.g., object 160) being stamped onto a painting (e.g., painting 152) to acquire the surface attributes of the painting. The "stamping" effect creates intersection points of a surface of the cube with the painting.

At block 504, the method 500 determines whether the graphical environment is operating in a first mode or a different second mode. For example, the exemplary method focuses on using two interaction modes, i.e., a first mode in which the objects interact to transfer the surface attributes and a second mode in which the objects interact differently (e.g., according to physics). Additionally, for example, the first mode may enable attribute transfer, while the second mode may enable normal interaction and disable attribute transfer.

In some implementations, surface attributes of the first object are not changed based on surface attributes of the second object in response to intersections associated with the second mode. For example, in another mode, attribute transfer is turned off, but two objects could still occupy the same space. In other words, in this particular mode, a virtual cube could be pushed through a wall, but the surface attributes of the wall would be not transferred to the cube, because the user turned off the attribute transfer mode. In some implementations, the first mode enables the first object to pass through the second object, and the second mode prevents the first object from passing through the second object.

In accordance with a determination that the graphical environment is operating in the first mode, and responsive to the intersection between the displayed first object and the displayed second object, at block 506, the method 500 identifies a portion of the first object where in the identified portion is intersecting the second object. In some implementations, identifying an intersection between two surfaces of two objects in the CGR experience is referred to herein as a trigger or trigger effect. For example, a trigger is when the geometry of each object intersects (e.g., when one or more pixels or voxels x, y, z coordinates of each object are equivalent).

In some implementations, the intersection is based on user input moving the first object. For example, a user can move a virtual cube and using a particular motion with a mouse, cursor, or virtual hand, can dip, stamp, pushing into, etc. the virtual cube into a painting (e.g., source object). In some implementations, the user input moves the first object into the second object, wherein the second object remains unchanged based on the input. For example, a user puts the virtual cube into a box, and no surface attribute transfer takes place. In some implementations, the user input moves the first object into the second object, wherein the second object changes to surround an inserted portion of the first object. For example, hydro-dipping a virtual cube into a bucket of paint.

In some implementations, the intersection is based on a movement of the first object or the second object, and the movement is generated via a physics engine. For example, an object rolling down or across the second object, or an object is dropped/bounced on the ground. In some implementations, the intersection is based on a deformation of the first object or the second object, and the deformation is generated based on contact between the first object and the second object. For example, the object is hydro-dipped, or the object is dropped on a malleable/soft object (i.e., a pillow) on the ground.

In accordance with a determination that the graphical environment is operating in the first mode, and responsive to the intersection between the displayed first object and the displayed second object, at block 508, the method 500 changes a surface attribute of the portion of the first object to include a surface attribute (e.g., a particular texture, a material, a physical property) of the second object (e.g., the source object) at the intersection including the surface attribute. For example, the texture along the line of intersection is transferred to the first object from the second object as the second object is dipped into, pushed into, stamped on, etc. the second object. In particular, for example, a virtual cube acquires the surface attributes of a painting that it touches or intersects with, as illustrated in FIGS. 6A-6B.

In some implementations, the method 500 further involves subtracting a second surface attribute from the first object based on a second intersection of the first object with a third object. For example, in an eraser mode, a user can erase surface attributes from objects in particular areas of the object, or for the entire object.

In some implementations, the portion of the first object is a first portion of the first object, and the method 500 further involves identifying a second portion of the first object that will not change surface attributes based on the intersection, wherein the first portion of the first object includes at least a section of the second portion of the first object, wherein changing the first portion of the first object to include the surface attribute does not change the surface attribute in the second portion. For example, virtually using painter's tape, or the like, to identify a particular area to paint. For example, a user may only want a small portion or center of one surface of a cube to acquire a surface attribute from the source object, so a user can use painter's tape (e.g., masking tape) to cover the portion of the surface of the object that would now acquire the surface attributes of the second object when the virtual cube is stamped upon the second object.

In some implementations, the method 500 further involves identifying a plurality of intersections involving the first object, and changing the first object based on the plurality of intersections. For example, to illustrate wear and tear, multiple interactions may occur for an object in the CGR experience, because the user is moving the first object (e.g., the virtual cube), during attribute transfer mode, to one or more source objects, and thus acquiring several surface attributes at different locations on the first object. In a specific example, grass stains and dirt stains on an avatars baseball player uniform from sliding into home plate, remain on the avatar throughout the gaming experience.

In some implementations, acquiring a surface attribute on the first object during attribute transfer mode and changing the first object based on a plurality of intersections may include a plurality of display options, including different blending methods for the acquired attributes. For example, when acquiring texture information, a user may be provided with a blending mode to multiply, screen, darken, lighten, overlay, etc., the acquired texture information for the cube. This would result in an accumulative appearance when the user has acquired textures from multiple sources that compose the textures with the different blending modes. This would not create additional layers, but instead change how acquired attributes are added to the current layer. Additionally, the user may want to create attribute layers which can be composed similar to what digital painting applications can offer for layers. For example, being able to acquire different layers of attributes may be blended and composed in an artistic fashion to create a unique look of attribute layers.

In some implementations, the surface attribute includes a texture. For example, RGB color, transferring pixels from one mesh's triangle to another mesh's triangle, or by copying equations that define appearance. In some implementations, the surface attribute includes a physical property. For example, a mass or a thickness of the source object. For example, a basketball could include physical attributes such as a particular thickness of the object. In some implementations, the surface attribute includes material property, such as reflective metal. In some implementations, the physical property of the source object could include an acoustic property. For example, wood would have a different acoustic property than concrete. In some implementations, the first object (e.g., a virtual cube) could acquire the acoustic properties of wood (e.g., from a chair) for half of the object, and acquire the acoustic properties of concrete for the remaining half of the object, such that in the CGR experience, if a user taps the first object, it would have different sounds depending on which half the user taps.

In some implementations, the first object corresponds to a virtual object and the second object corresponds to a real object of a physical environment in which the CGR environment is provided. For example, a virtual apple is thrown out to intersect with a real-world wall and acquires the color pattern of the wall. Some various implementations of method 500 are illustrated with reference to FIGS. 6-8.

FIGS. 6A-6B depict objects (e.g., physical objects and/or virtual objects) that can be combined with real objects of the physical environment from the images captured of the environment 105 and recreated within a CGR experience (e.g., mixed reality experience). In this particular example illustrated in FIGS. 6A-6B, surface attributes of a painting are copied (e.g., "stamped") onto a particular surface of a virtual cube. FIG. 6A illustrates a CGR image 605a that includes an acquiring object 610 (e.g., a virtual cube such as object 160 of FIG. 1), a source object 620 (e.g., painting 152 of FIG. 1), and an interaction icon 602 (e.g., interaction icon 454 of FIG. 4) that a user can control to interact and paint or acquire surface attributes thereon using objects within the CGR environment of CGR image 605a. FIG. 6B illustrates a CGR image 605b that includes the interaction icon 602 after selecting (e.g., virtually "grabbing") the acquiring object 610 and moving the acquiring object 610 and touching or stamping a surface of the acquiring object 610 onto the source object 620.

In some implementations, during an "on" mode (e.g., attribute transfer engaged as a first mode), the surface attributes of the source object 620 transfer to the intersecting points on the acquiring object 610. For example, one side of the virtual cube (e.g., acquiring object surface plane 612)

was stamped onto the painting during an attribute transfer mode and acquired the surface attributes of the painting at the intersecting points or planes. In some implementations, in an "off" mode (e.g., attribute transfer is not engaged as a second mode), the surface attributes of the source object 620 would not transfer to the intersecting points on the acquiring object 610. Thus, a user can interact with the CGR experience using the attribute transfer system and move objects around without having surface attributes transfer between objects every time one or more objects intersect with each other.

Figure 7B:
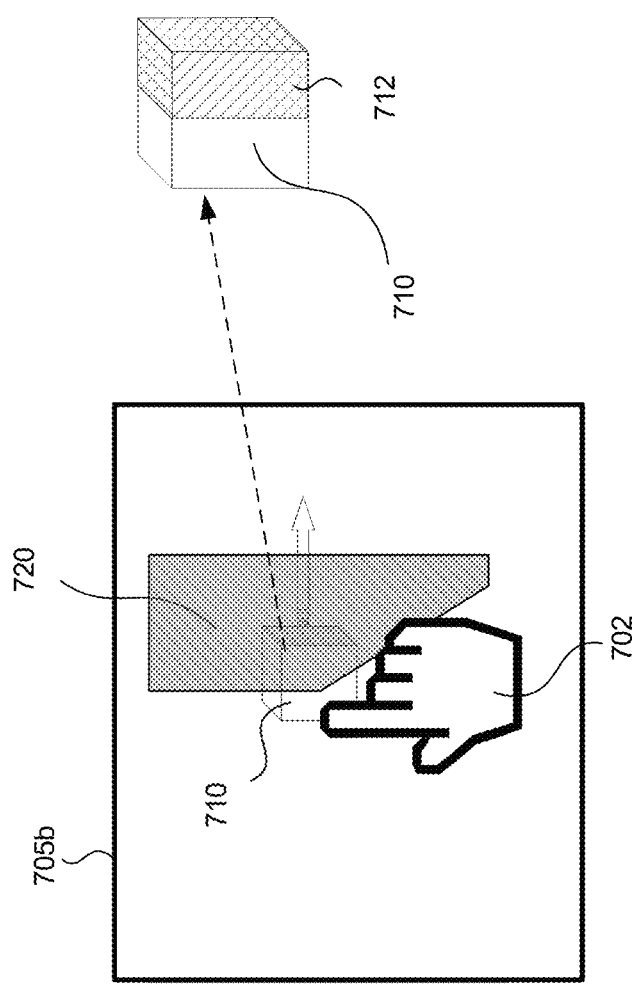
FIGS. 7A-7B illustrate an example attribute transfer event between two objects in accordance with some implementations.
Figure 7A:
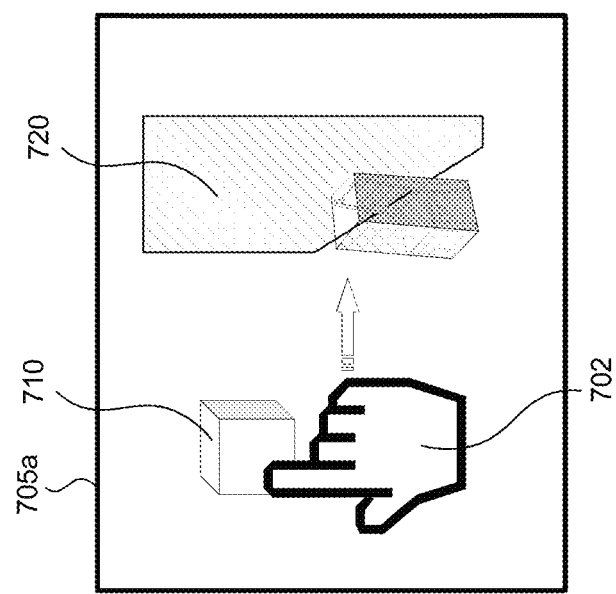

FIGS. 7A-7B depict objects (e.g., physical objects and/or virtual objects) that can be combined with real objects of the physical environment from the images captured of the environment 105 and recreated within a CGR experience (e.g., mixed reality experience). In this particular example illustrated in FIGS. 7A-7B, surface attributes of a wall are copied onto a virtual cube as the cube is passed through the wall. FIG. 7A illustrates a CGR image 705*a* that includes an acquiring object 710 (e.g., a virtual cube such as object 160 of FIG. 1), a source object 720 (e.g., wall 132 of FIG. 1), and an interaction icon 702 (e.g., interaction icon 454 of FIG. 4) that a user can control to interact and paint or acquire surface attributes thereon using objects within the CGR environment of CGR image 705*a*. FIG. 7B illustrates a CGR image 705*b* that includes the interaction icon 702 after selecting (e.g., virtually "grabbing") the acquiring object 710 and moving the acquiring object 710 and through a surface plane of the source object 720. In particular, as illustrated in FIG. 7B, the acquiring object 710 (e.g., virtual cube) is pushed halfway through the source object 720 (e.g., a wall), such that the acquiring object 710 acquires the surface attributes of the source object 720 at each intersecting point. Thus, the acquiring object 710 is shown with half of the surface area "painted" with the surface attributes for the source object 720, as shown at shaded area 712.

Figure 8B:
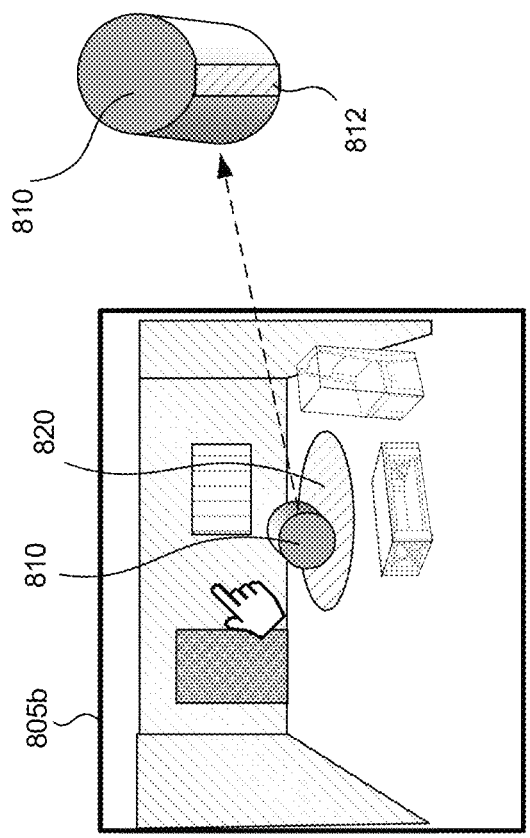
FIGS. 8A-8B illustrate an example attribute transfer event between two objects in accordance with some implementations.
Figure 8A:
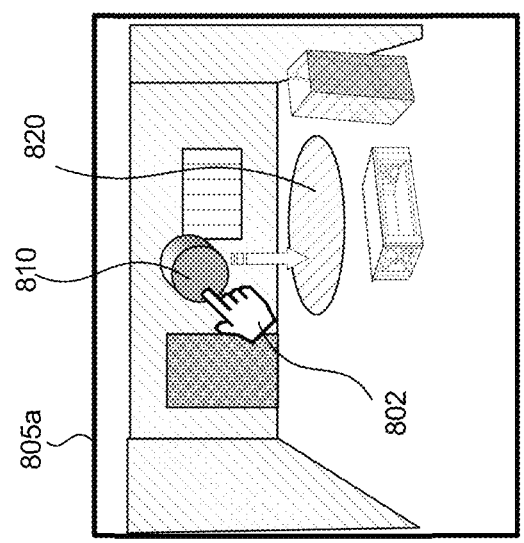

FIGS. 8A-8B depict objects (e.g., physical objects and/or virtual objects) that can be combined with real objects of the physical environment from the images captured of the environment 105 and recreated within a CGR experience (e.g., mixed reality experience). In this particular example illustrated in FIGS. 8A-8B, surface attributes of a rug/floor are copied onto a virtual cylindrical drum (e.g., a non-flat object that could roll) after the virtual cylindrical drum is dropped onto the rug/floor. FIG. 8A illustrates a CGR image 805*a* that includes an acquiring object 810 (e.g., a virtual cylindrical drum), a source object 820 (e.g., rug 144 of FIG. 1), and an interaction icon 802 (e.g., interaction icon 454 of FIG. 4) that a user can control to interact and paint or acquire surface attributes thereon using objects within the CGR environment of CGR image 805*a*. FIG. 8B illustrates a CGR image 805*b* that includes the interaction icon 802 after selecting (e.g., virtually "grabbing") the acquiring object 810 and dropping the acquiring object 810 onto the surface of the source object 820. In particular, as illustrated in FIG. 8B, the acquiring object 810 (e.g., virtual cylindrical drum) is dropped onto the source object 820 (e.g., a rug), such that the acquiring object 810 acquires the surface attributes of the source object 820 at each intersecting point. Thus, the acquiring object 810 is shown with a bottom portion of the surface area "painted" with the surface attributes for the source object 820, as shown at shaded area 812. If the acquiring object 810 rolled, then the area 812 would be larger, as the intersecting points between the acquiring object 810 and the source object 820 would have increased and covered a larger area. In some implementations, a physics engine can determine whether dropping acquiring object 810 onto the floor would cause any rolling or whether the acquiring object 810 would remain in the location as illustrated in CGR image 805*b*. Additionally, or alternatively, a physics engine could be turned on or off (e.g., a different mode) to replicate gravity, for example, or determine whether objects that touch can proceed and cross through each other (e.g., FIG. 7B) or if physics applies, and the object would bounce off the floor, or at least not be able to push through another object. A physics engine example of dropping an object down a hill is further described below.

Figure 9:
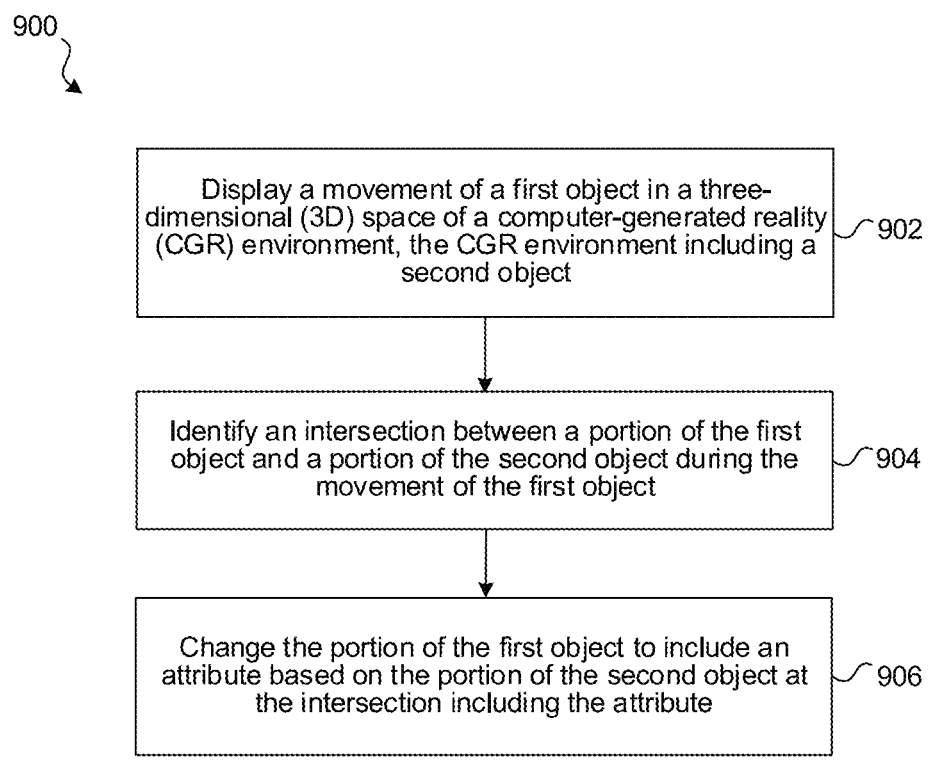
FIG. 9 is a flowchart representation of an exemplary method that performs a surface attribute transfer between two objects in a CGR environment in accordance with some implementations.

FIG. 9 is a flowchart representation of an exemplary method 900 that changes a surface attribute of a portion of a first object (e.g., an acquiring object) to include a surface attribute of a second object (e.g., a source object) at an intersection including the surface attribute. In some implementations, the method 900 is performed by a device (e.g., server 110 of FIGS. 1 and 2), such as a mobile device, desktop, laptop, or server device. The method 900 can be performed on a device (e.g., device 120 of FIGS. 1 and 3) that has a screen for displaying 2D images and/or a screen for viewing stereoscopic images such as a head-mounted display (HMD). In some implementations, the method 900 is performed by processing logic, including hardware, firmware, software, or a combination thereof. In some implementations, the method 900 is performed by a processor executing code stored in a non-transitory computer-readable medium (e.g., a memory). The attribute transfer process of method 900 is illustrated with reference to FIGS. 10-11.

At block 902, the method 900 displays a movement of a first object in a 3D space of a CGR environment, where the CGR environment includes a second object. For example, the first object (e.g., the acquiring object) touches, is stamped on, is pushed into, is rolling down, or passed through the second object (e.g., the source object). In some implementations, attribute transfer involves a trigger effect (e.g., an activation) when one object (e.g., the acquiring object) is touched onto another surface of another object (e.g., the source object), or pushed into or through another object (e.g., a wall). A trigger is when the geometry of each object intersects (e.g., when one or more pixels or voxels x, y, z coordinates of each object are equivalent). In the physical world, two objects cannot occupy the same space. In the virtual world (e.g., a CGR experience) two objects can virtually occupy the same space. FIGS. 6A-6B illustrate a stamping example with a virtual cube (e.g., object 160) being stamped onto a painting (e.g., painting 152) to acquire the surface attributes of the painting. The "stamping" effect creates intersection points of a surface of the cube with the painting.

At block 904, the method 900 identifies a portion of the first object where in the identified portion is intersecting the second object. In some implementations, identifying an intersection between two surfaces of two objects in the CGR experience is referred to herein as a trigger or trigger effect. For example, a trigger is when the geometry of each object intersects (e.g., when one or more pixels or voxels x, y, z coordinates of each object are equivalent).

In some implementations, the intersection is based on user input moving the first object. For example, a user can move a virtual cube and using a particular motion with a mouse, cursor, or virtual hand, can dip, stamp, pushing into, etc. the virtual cube into a painting (e.g., source object). In some implementations, the user input moves the first object into the second object, wherein the second object remains unchanged based on the input. For example, a user puts the virtual cube into a box, and no attribute transfer takes place. In some implementations, the user input moves the first object into the second object, wherein the second object changes to surround an inserted portion of the first object. For example, hydro-dipping a virtual cube into a bucket of paint.

In some implementations, a user can also set an opacity setting for how much of the attribute is acquired and added to the dipped or simulated object to have control of the composition of the previously acquired attributes. For example, for hydro-dipping a virtual cube into a bucket of black paint, a user may want a 50% opacity level, so the surface of the cube that contacts the water would be dipped and show 50% of the hue of the black paint (e.g., a shade of grey).

Figure 10B:
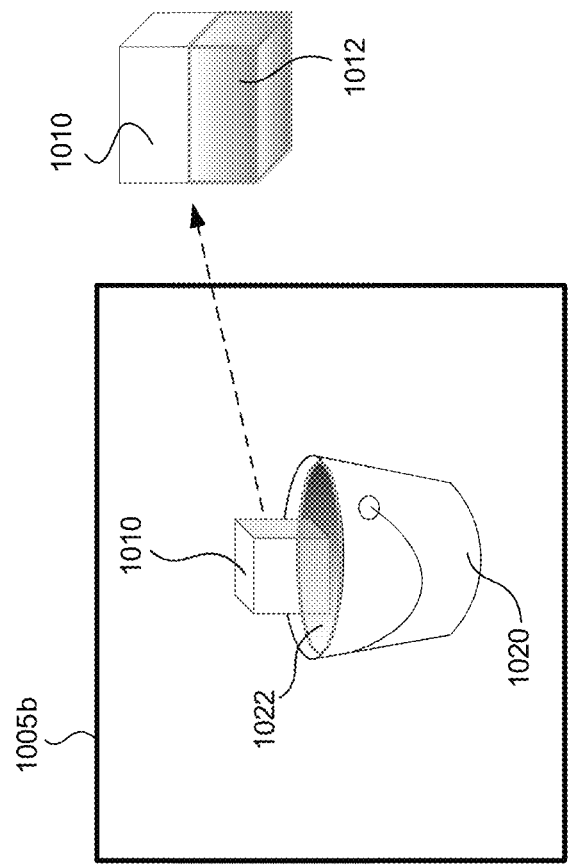
FIGS. 10A-10B illustrate an example attribute transfer event between two objects in accordance with some implementations.
Figure 10A:
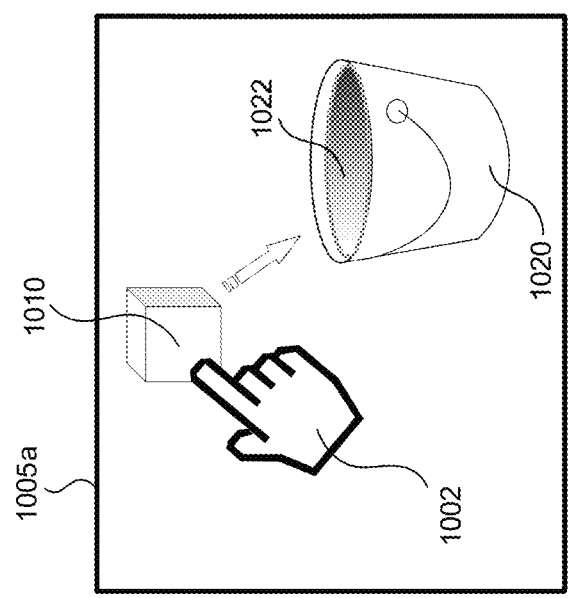
Figure 11B:
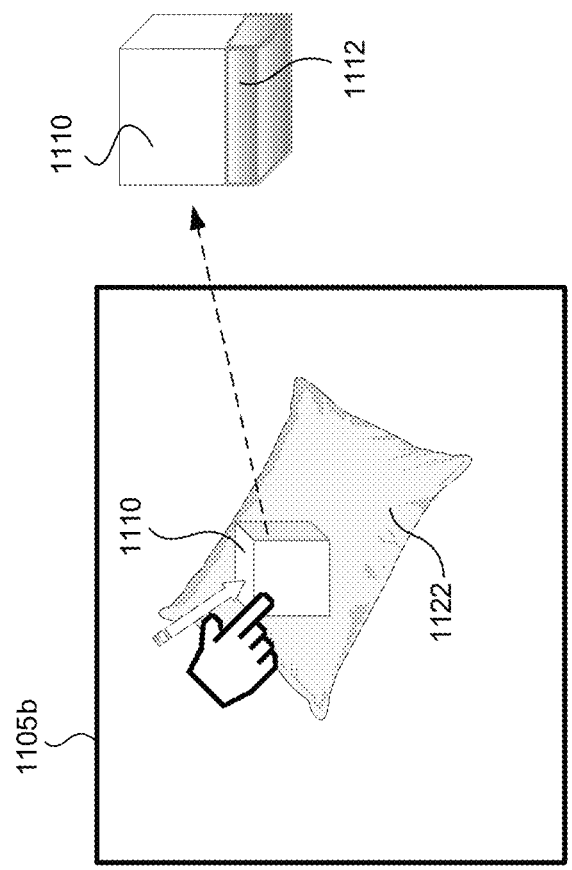
FIGS. 11A-11B illustrate an example attribute transfer event between two objects in accordance with some implementations.
Figure 11A:
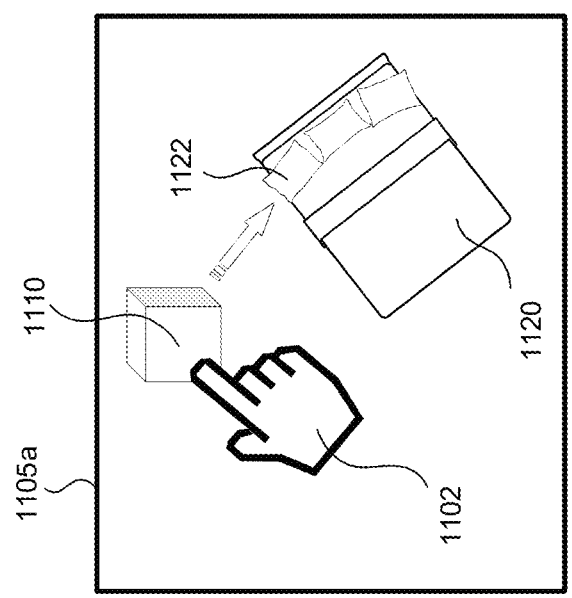

In some implementations, the intersection is based on a movement of the first object or the second object, and the movement is generated via a physics engine. For example, an object rolling down or across the second object, or an object is dropped/bounced on the ground. In some implementations, the intersection is based on a deformation of the first object or the second object, and the deformation is generated based on contact between the first object and the second object. For example, the object is hydro-dipped in a container of water as illustrated in FIGS. 10A-10B. Or, for example, the object is dropped on a malleable/soft object (i.e., a pillow) on the ground, as illustrated in FIGS. 11A-11B.

At block 906, the method 900 changes the portion of the first object to include a surface attribute (e.g., a particular texture, a material, a physical property) based on the portion of the second object (e.g., the source object) at the intersection including the surface attribute. For example, the texture along the line of intersection is transferred to the first object from the second object as the second object is dipped into, pushed into, stamped on, etc. the second object. In particular, for example, a virtual cube acquires the surface attributes of a painting that it touches or intersects with, as illustrated in FIGS. 6A-6B.

In some implementations, the method 900 further involves subtracting a second surface attribute from the first object based on a second intersection of the first object with a third object. For example, in an eraser mode, a user can erase surface attributes from objects in particular areas of the object, or for the entire object.

In some implementations, the portion of the first object is a first portion of the first object, and the method 900 further involves identifying a second portion of the first object that will not change surface attributes based on the intersection, wherein the first portion of the first object includes at least a section of the second portion of the first object, wherein changing the first portion of the first object to include the surface attribute does not change the surface attribute in the second portion. For example, virtually using painter's tape, or the like, to identify a particular area to paint. For example, a user may only want a small portion or center of one surface of a cube to acquire a surface attribute from the source object, so a user can use painter's tape (e.g., masking tape) to cover the portion of the surface of the object that would now acquire the surface attributes of the second object when the virtual cube is stamped upon the second object.

In some implementations, the method 900 further involves identifying a plurality of intersections involving the first object, and changing the first object based on the plurality of intersections. For example, to illustrate wear and tear, multiple interactions may occur for an object in the CGR experience, because the user is moving the first object (e.g., the virtual cube), during attribute transfer mode, to one or more source objects, and thus acquiring several surface attributes at different locations on the first object. In a specific example, grass stains and dirt stains on an avatars baseball player uniform from sliding into home plate, remain on the avatar throughout the gaming experience.

In some implementations, the surface attribute includes a texture. For example, RGB color, transferring pixels from one mesh's triangle to another mesh's triangle, or by copying equations that define appearance. In some implementations, the surface attribute includes a physical property. For example, a mass or a thickness of the source object. For example, a basketball could include physical attributes such as a particular thickness of the object. In some implementations, the surface attribute includes material property, such as reflective metal. In some implementations, the physical property of the source object could include an acoustic property. For example, wood would have a different acoustic property than concrete. In some implementations, the first object (e.g., a virtual cube) could acquire the acoustic properties of wood (e.g., from a chair) for half of the object, and acquire the acoustic properties of concrete for the remaining half of the object, such that in the CGR experience, if a user taps the first object, it would have different sounds depending on which half the user taps.

In some implementations, the first object corresponds to a virtual object and the second object corresponds to a real object of a physical environment in which the CGR environment is provided. For example, a virtual apple is thrown out to intersect with a real-world wall and acquires the color pattern of the wall. Some various implementations of method 900 are illustrated with reference to FIGS. 10-11.

FIGS. 10A-10B depict objects (e.g., physical objects and/or virtual objects) that can be combined with real objects of the physical environment from the images captured of the environment 105 and recreated within a CGR experience (e.g., mixed reality experience). In this particular example illustrated in FIGS. 10A-10B, surface attributes of a liquid inside of a bucket are copied onto a virtual cube as the cube is dipped into the liquid. This process is also known as hydrodipping (also known as immersion printing, water transfer printing, and hydro imaging), which is a unique process that allows you to apply graphics to almost any 3D object (e.g., dipping an object into a liquid that includes a layer of paint), except FIGS. 10A-10B is performed within a CGR environment. FIG. 10A illustrates a CGR image 1005*a* that includes an acquiring object 1010 (e.g., a virtual cube such as object 160 of FIG. 1), a source object 1020 (e.g., a bucket) that contains the source liquid 1022, and an interaction icon 1002 (e.g., interaction icon 454 of FIG. 4) that a user can control to interact and paint or acquire surface attributes thereon using objects within the CGR environment of CGR image 1005*a*. FIG. 10B illustrates a CGR image 1005*b* that includes the interaction icon 1002 after selecting (e.g., virtually "grabbing") the acquiring object 1010 and moving the acquiring object 1010 into liquid 1022 of the source object 1020. In particular, as illustrated in FIG. 10B, the acquiring object 1010 (e.g., virtual cube) is hydrodipped by being pushed halfway into the liquid 1022 of the source object 1020 (e.g., a bucket), such that the acquiring object 1010 acquires the surface attributes of the liquid 1022 at each intersecting point (e.g., every pixel or voxel of the cube that intersects with liquid—hydrodipping). Thus, the acquiring object 1010 is shown with half of the surface area "painted" with the surface attributes of the liquid 1022, as shown at shaded area 1012.

FIGS. 11A-11B depict objects (e.g., physical objects and/or virtual objects) that can be combined with real objects of the physical environment from the images captured of the environment 105 and recreated within a CGR experience (e.g., mixed reality experience). In this particular example illustrated in FIGS. 11A-11B, surface attributes of a malleable object (e.g., a pillow) are copied onto another object (e.g., a cube) when the cube is placed, pushed, and/or dropped onto the malleable object. FIG. 11A illustrates a CGR image 1105a that includes an acquiring object 1110 (e.g., a virtual cube such as object 160 of FIG. 1), a source object 1122 (e.g., a pillow on top of a bed 1120), and an interaction icon 1102 (e.g., interaction icon 454 of FIG. 4) that a user can control to interact and paint or acquire surface attributes thereon using objects within the CGR environment of CGR image 1105a. FIG. 11B illustrates a CGR image 1105b that includes the interaction icon 1102 after selecting (e.g., virtually "grabbing") the acquiring object 1110 and placing, pushing, and/or dropping the acquiring object 1110 onto the surface of the source object 1122. In particular, as illustrated in FIG. 11B, the acquiring object 1110 (e.g., a virtual cube) is placed onto the surface of the source object 1120 (e.g., a pillow), such that the acquiring object 1110 acquires the surface attributes of the source object 1120 at each intersecting point. Thus, the acquiring object 1110 is shown with a bottom portion of the surface area "painted" with the surface attributes for the source object 1120, as shown at shaded area 1112. In some implementations, if a user utilizes the interaction icon 1102 to push the acquiring object 1110 onto the surface of the source object 1122 which is malleable, the acquiring object 1110 can acquire different levels of variations of the surface attributes of the source object 1120 at each intersecting point depending on the force at each intersecting point. For example, in a physical world, pushing hard onto a pillow would create more force on the bottom of the object in the shear force direction of the push into the pillow. The pillow may then be pushed up around some of the sides of the cube, but not with the same shear force at the bottom. Thus the sides of the cube may acquire the surface attributes of the pillow, but not necessarily at the same level. For example, if the pillow was red, following the attribute transfer process as described in this example, the bottom of the cube may be the same shade of red as the pillow, but the sides may be a lighter red or pinkish hue.

Additionally, or alternatively, a physics engine may be used to determine the shear force on the bottom versus the sides of the cube during the attribute transfer process. A physics engine or simulation can ensure the cube cannot exceed the limitations of the surrounding environment. For example, if a user wants to grab the cube and drag it or dip the cube with respect to a carpeted floor, if a physics simulation is active, the cube cannot go through the carpet, but it can have its surfaces touch or align with the surface of the carpet. This would transfer the attributes on the aligned surfaces, but restrict the movement of the object so that it doesn't fully intersect with the second object. Additionally, similar to blending different acquired surface attributes (e.g., multiply, screen, darken, lighten, overlay, etc.) discussed herein, physics properties can also be acquired by a physics engine and composed in similar ways, such as add, subtract, multiply, divide, etc. A physics engine example of dropping an object is further described below.

Figure 12:
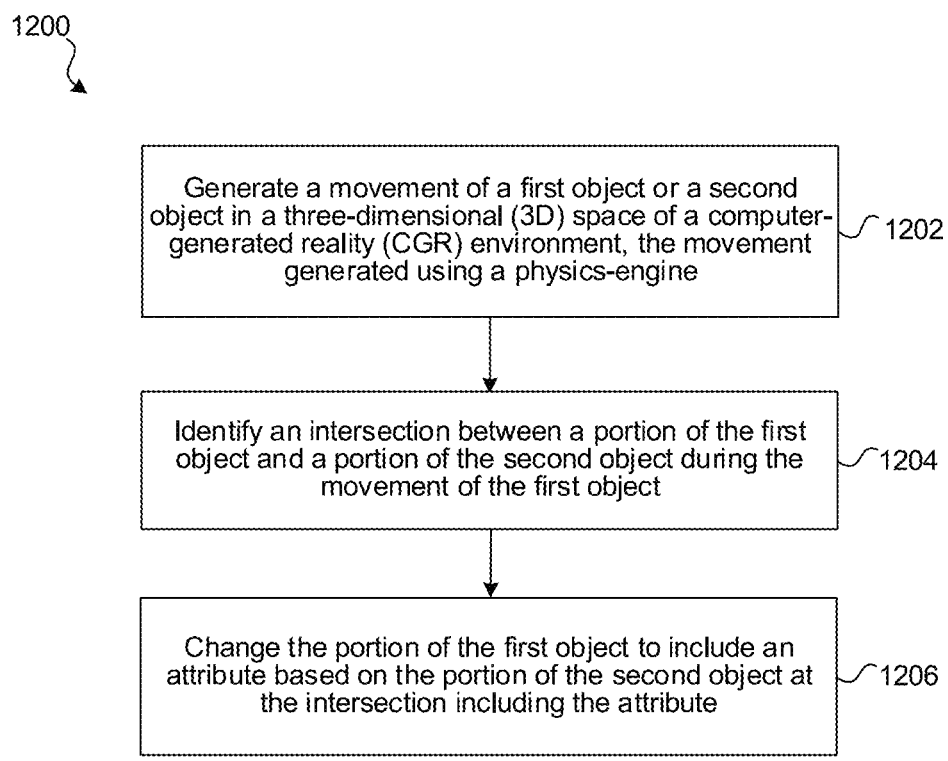
FIG. 12 is a flowchart representation of an exemplary method that performs an attribute transfer between two objects in a CGR environment in accordance with some implementations.

FIG. 12 is a flowchart representation of an exemplary method 1200 that changes a surface attribute of a portion of a first object (e.g., an acquiring object) to include a surface attribute of a second object (e.g., a source object) at an intersection including the surface attribute using a physics engine. In some implementations, the method 1200 is performed by a device (e.g., server 110 of FIGS. 1 and 2), such as a mobile device, desktop, laptop, or server device. The method 1200 can be performed on a device (e.g., device 120 of FIGS. 1 and 3) that has a screen for displaying 2D images and/or a screen for viewing stereoscopic images such as a head-mounted display (HMD). In some implementations, the method 1200 is performed by processing logic, including hardware, firmware, software, or a combination thereof. In some implementations, the method 1200 is performed by a processor executing code stored in a non-transitory computer-readable medium (e.g., a memory). The attribute transfer process of method 1200 is illustrated with reference to FIG. 13.

At block 1202, the method 1200 generates a movement of a first object (e.g., the acquiring object) or a second object (e.g., the source object) in a three-dimensional (3D) space of a computer-generated reality (CGR) environment, where the movement is generated using a physics-engine. For example, a user may throw, drop, or roll a first object to intersect with a second object. As another example, the second object may deform as a first object intersects with it. The exemplary method initially involves generating a movement of a first object or a second object in a three-dimensional (3D) space of a computer-generated reality (CGR) environment, the movement generated using a physics-engine. For example, a ball may roll down a hill to acquire the grass pattern of the hill, the user may drop a cube to bounce it on a table top, etc. For example, the first object (e.g., the acquiring object) touches, is stamped on, is pushed into, is rolling down, or passed through the second object (e.g., the source object). In some implementations, attribute transfer involves a trigger effect (e.g., an activation) when one object (e.g., the acquiring object) is touched onto another surface of another object (e.g., the source object), or pushed into or through another object (e.g., a wall). A trigger is when the geometry of each object intersects (e.g., when one or more pixels or voxels x, y, z coordinates of each object are equivalent). In the physical world, two objects cannot occupy the same space. In the virtual world (e.g., a CGR experience) two objects can virtually occupy the same space. FIG. 13 illustrates an example of a virtual cube (e.g., object 160) being rolled down a hill to acquire the surface attributes of the hill as the cube is rolling or tumbling down. Each time the cube touches the ground, it creates intersection points of a surface of the cube with the ground.

At block 1204, the method 1200 identifies an intersection between a portion of the first object and a portion of the second object during the movement of the first object. In some implementations, identifying an intersection between two surfaces of two objects in the CGR experience is referred to herein as a trigger or trigger effect. For example, a trigger is when the geometry of each object intersects (e.g., when one or more pixels or voxels x, y, z coordinates of each object are equivalent).

In some implementations, the intersection is based on user input moving the first object. For example, a user can move a virtual cube and using a particular motion with a mouse, cursor, or virtual hand, can dip, stamp, pushing into, etc. the virtual cube into a painting (e.g., source object). In some implementations, the user input moves the first object into the second object, wherein the second object remains unchanged based on the input. For example, a user puts the virtual cube into a box, and no attribute transfer takes place. In some implementations, the user input moves the first object into the second object, wherein the second object changes to surround an inserted portion of the first object. For example, hydro-dipping a virtual cube into a bucket of paint.

In some implementations, the intersection is based on a movement of the first object or the second object, and the movement is generated via a physics engine. For example, an object rolling down or across the second object, or an object is dropped/bounced on the ground. For example, the object is rolled down a hill as illustrated in FIGS. 13A-13B. In some implementations, the intersection is based on a deformation of the first object or the second object, and the deformation is generated based on contact between the first object and the second object. For example, the object is hydro-dipped in a container of water as illustrated in FIGS. 10A-10B. Or, for example, the object is dropped on a malleable/soft object (i.e., a pillow) on the ground, as illustrated in FIGS. 11A-11B.

At block 1206, the method 1200 changes the portion of the first object to include a surface attribute (e.g., a particular texture, a material, a physical property) based on the portion of the second object at the intersection including the surface attribute. changes the portion of the first object to include a surface attribute (e.g., a particular texture, a material, a physical property) based on the portion of the second object (e.g., the source object) at the intersection including the surface attribute. For example, the texture along the line of intersection is transferred to the first object from the second object as the second object is dipped into, pushed into, stamped on, etc. the second object. In particular, for example, a virtual cube acquires the surface attributes of a painting that it touches or intersects with, as illustrated in FIGS. 6A-6B.

In some implementations, the method 1200 further involves subtracting a second surface attribute from the first object based on a second intersection of the first object with a third object. For example, in an eraser mode, a user can erase surface attributes from objects in particular areas of the object, or for the entire object.

In some implementations, the portion of the first object is a first portion of the first object, and the method 1200 further involves identifying a second portion of the first object that will not change surface attributes based on the intersection, wherein the first portion of the first object includes at least a section of the second portion of the first object, wherein changing the first portion of the first object to include the surface attribute does not change the surface attribute in the second portion. For example, virtually using painter's tape, or the like, to identify a particular area to paint. For example, a user may only want a small portion or center of one surface of a cube to acquire a surface attribute from the source object, so a user can use painter's tape (e.g., masking tape) to cover the portion of the surface of the object that would now acquire the surface attributes of the second object when the virtual cube is stamped upon the second object.

In some implementations, the method 1200 further involves identifying a plurality of intersections involving the first object, and changing the first object based on the plurality of intersections. For example, to illustrate wear and tear, multiple interactions may occur for an object in the CGR experience, because the user is moving the first object (e.g., the virtual cube), during attribute transfer mode, to one or more source objects, and thus acquiring several surface attributes at different locations on the first object. In a specific example, grass stains and dirt stains on an avatars baseball player uniform from sliding into home plate, remain on the avatar throughout the gaming experience.

In some implementations, the surface attribute includes a texture. For example, RGB color, transferring pixels from one mesh's triangle to another mesh's triangle, or by copying equations that define appearance. In some implementations, the surface attribute includes a physical property. For example, a mass or a thickness of the source object. For example, a basketball could include physical attributes such as a particular thickness of the object. In some implementations, the surface attribute includes material property, such as reflective metal. In some implementations, the physical property of the source object could include an acoustic property. For example, wood would have a different acoustic property than concrete. In some implementations, the first object (e.g., a virtual cube) could acquire the acoustic properties of wood (e.g., from a chair) for half of the object, and acquire the acoustic properties of concrete for the remaining half of the object, such that in the CGR experience, if a user taps the first object, it would have different sounds depending on which half the user taps.

In some implementations, the first object corresponds to a virtual object and the second object corresponds to a real object of a physical environment in which the CGR environment is provided. For example, a virtual apple is thrown out to intersect with a real-world wall and acquires the color pattern of the wall as determined by the physics engine. Some various implementations of method 1200 are illustrated with reference to FIGS. 13A-13B.

FIGS. 13A-13B depict objects (e.g., physical objects and/or virtual objects) that can be combined with real objects of the physical environment from the images captured of the environment 105 and recreated within a CGR experience (e.g., mixed reality experience). In the particular example illustrated in FIGS. 13A-13B, surface attributes of a surface of a declined plane, such as a hill (e.g., the ground along a hillside, a staircase, an object at angle, etc.) are copied onto a cube (e.g., a dice rolling down a hill) after the cube is rolled or thrown down a hill. FIG. 13A illustrates a CGR image 1305a that includes an acquiring object 1310 (e.g., a cube), a source object 1320 (e.g., a hill), and an interaction icon 1302 (e.g., interaction icon 454 of FIG. 4) that a user can control to interact and paint or acquire surface attributes thereon using objects within the CGR environment of CGR image 1305a. FIG. 13B illustrates a CGR image 1305b that includes the interaction icon 1302 after selecting (e.g., virtually "grabbing") the acquiring object 1310 and dropping or throwing the acquiring object 1310 onto the surface of the source object 1320 such that the acquiring object 1310 rolls or tumbles down the a surface plane of the source object 1320. In particular, as illustrated in FIG. 13B, the acquiring object 1310 (e.g., cube, such as a dice) is dropped or thrown onto the source object 1320 (e.g., a hill), such that the acquiring object 1310 acquires the surface attributes of the source object 1320 at each intersecting point (e.g., each time the dice hits or touches the surface of the hill). Thus, the acquiring object 1310 is shown with portions of the surface area "painted" with the surface attributes for the source object 1320, as shown at shaded areas 1312a, 1312b, and 1312c. In the example implementation, a physics engine can determine the force of dropping acquiring object 1310 onto the hill that would cause the number times the acquiring object 1310 (e.g., the cube) would roll down the hill, and how many times the acquiring object 1310 would intersect with the surface of the source object 1320.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   identifying an intersection between a displayed first object and a displayed second object in a graphical environment;
   determining whether the graphical environment is operating in a first mode or a different second mode, wherein the first mode enables the first object to pass through the second object, and the second mode prevents the first object from passing through the second object; and
   in accordance with a determination that the graphical environment is operating in the first mode, responsive to the identified intersection between the displayed first object and the displayed second object:
   identifying at least a portion of the first object that is intersecting with at least a portion of the second object; and
   changing a first surface attribute of at least the portion of the first object to comprise a second surface attribute of the second object at the identified intersection between the displayed first object and the displayed second object, wherein at least a portion of the second object comprises the second surface attribute.

2. The method of claim 1, further comprising, in accordance with a determination that the graphical environment is operating in the second mode, responsive to the intersection between the displayed first object and the displayed second object, moving the displayed first object and the displayed second object consistent with a model of physics.

3. The method of claim 1, wherein the intersection is based on input moving the first object.

4. A non-transitory computer-readable storage medium, storing computer-executable program instructions on a computer to perform operations comprising:
   identifying an intersection between a displayed first object and a displayed second object in a graphical environment;
   determining whether the graphical environment is operating in a first mode or a different second mode, wherein the first mode enables the first object to pass through the second object, and the second mode prevents the first object from passing through the second object; and in accordance with a determination that the graphical environment is operating in the first mode, responsive to the identified intersection between the displayed first object and the displayed second object:

identifying at least a portion of the first object that is intersecting with at least a portion of the second object; and changing a first surface attribute of at least the portion of the first object to comprise a second surface attribute of the second object at the identified intersection between the displayed first object and the displayed second object, wherein at least a portion of the second object comprises the second surface attribute.

5. The non-transitory computer-readable storage medium of claim 4, wherein in accordance with a determination that the graphical environment is operating in the second mode, the operations further comprise:

responsive to the intersection between the displayed first object and the displayed second object, moving the displayed first object and the displayed second object consistent with a model of physics.

6. The non-transitory computer-readable storage medium of claim 4, wherein a surface attribute of the first object is not changed based on the surface attribute of the second object in response to intersections associated with the second mode.

7. The non-transitory computer-readable storage medium of claim 4, wherein the intersection is based on input moving the first object.

8. The non-transitory computer-readable storage medium of claim 7, wherein the input moves the first object into the second object, wherein the second object remains unchanged based on the input.

9. The non-transitory computer-readable storage medium of claim 7, wherein the input moves the first object into the second object, wherein the second object changes to surround an inserted portion of the first object.

10. The non-transitory computer-readable storage medium of claim 4, wherein the intersection is based on a movement of the first object or the second object, wherein the movement is generated via a physics engine.

11. The non-transitory computer-readable storage medium of claim 4, wherein the intersection is based on a deformation of the first object or the second object, wherein the deformation is generated based on contact between the first object and the second object.

12. The non-transitory computer-readable storage medium of claim 4, wherein the operations further comprise subtracting a second surface attribute from the first object based on a second intersection of the first object with a third object.

13. The non-transitory computer-readable storage medium of claim 4, wherein the portion of the first object is a first portion of the first object, wherein the operations further comprise:

identifying a second portion of the first object that will not change surface attributes based on the intersection, wherein the first portion of the first object includes at least a section of the second portion of the first object, wherein changing the first portion of the first object to comprise the surface attribute of the second object does not change a surface attribute in the second portion.

14. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

identifying an intersection between a displayed first object and a displayed second object in a graphical environment;

determining whether the graphical environment is operating in a first mode or a different second mode, wherein the first mode enables the first object to pass through the second object, and the second mode prevents the first object from passing through the second object; and in accordance with a determination that the graphical environment is operating in the first mode, responsive to the identified intersection between the displayed first object and the displayed second object:

identifying at least a portion of the first object that is intersecting with at least a portion of the second object; and changing a first surface attribute of at least the portion of the first object to comprise a second surface attribute of the second object at the identified intersection between the displayed first object and the displayed second object, wherein at least a portion of the second object comprises the second surface attribute.

15. The system of claim 14, wherein the operations further comprise:

identifying a plurality of intersections involving the first object; and changing the first object based on the plurality of intersections.

16. The system of claim 14, wherein the surface attribute comprises a texture.

17. The system of claim 14, wherein the surface attribute comprises a physical property or a material property.

18. The system of claim 14, wherein the first object corresponds to a virtual object and the second object corresponds to a real object of a physical environment in which the graphical environment is provided.

* * * * *